(No Model.) 2 Sheets—Sheet 1.

R. HENDRICKS.
GANG PLOW.

No. 301,985. Patented July 15, 1884.

Witnesses:
Geo. H. Strong.

Inventor.
Robt. Hendricks
By Dewey & Co. Att'ys (No Model.) 2 Sheets—Sheet 2.

R. HENDRICKS.
GANG PLOW.

No. 301,985. Patented July 15, 1884.

Witnesses:
Geo. H. Strong.
J. H. Nurse.

Inventor:
Robt. Hendricks
By Dewey & Co. Att'ys

UNITED STATES PATENT OFFICE.

ROBERT HENDRICKS, OF WOODSIDE, CALIFORNIA.

GANG-PLOW.

SPECIFICATION forming part of Letters Patent No. 301,985, dated July 15, 1884.

Application filed March 18, 1884. (No model.)

*To all whom it may concern:*

Be it known that I, ROBERT HENDRICKS, of Woodside, county of San Mateo, and State of California, have invented an Improvement in Gang-Plows; and I hereby declare the following to be a full, clear, and exact description thereof.

My invention relates to the class of gang-plows and to certain novel improvements therein.

These improvements consist in the arrangement of the plows in front of the wheels and seat, in the means for raising the plows out of the ground, in the means for throwing them to one side on sidling ground, in a means for changing the inclination of the plows, and in certain other and further details of construction, all of which will hereinafter appear, reference being made to the accompanying drawings.

Figure 1:
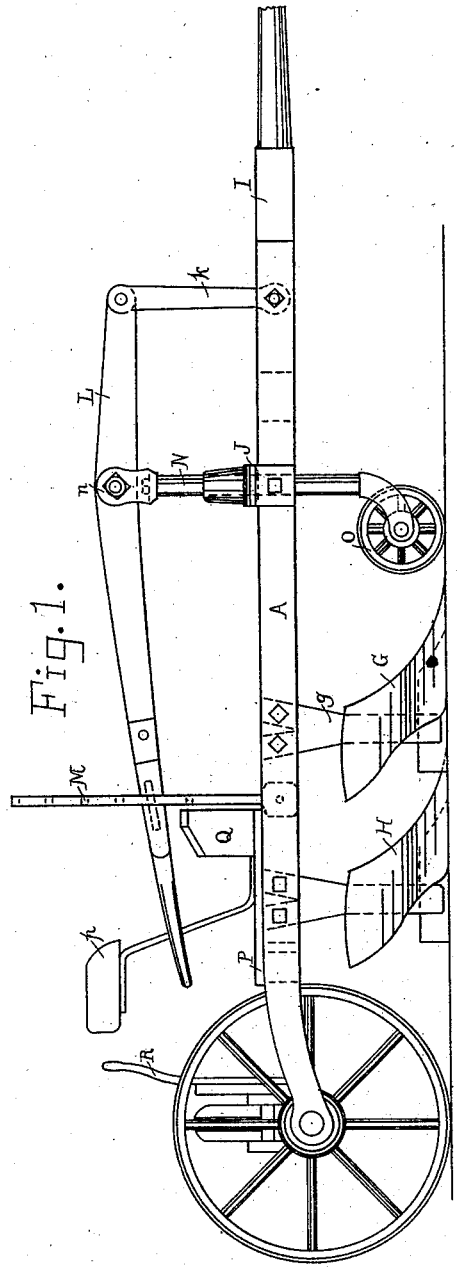
Figure 2:
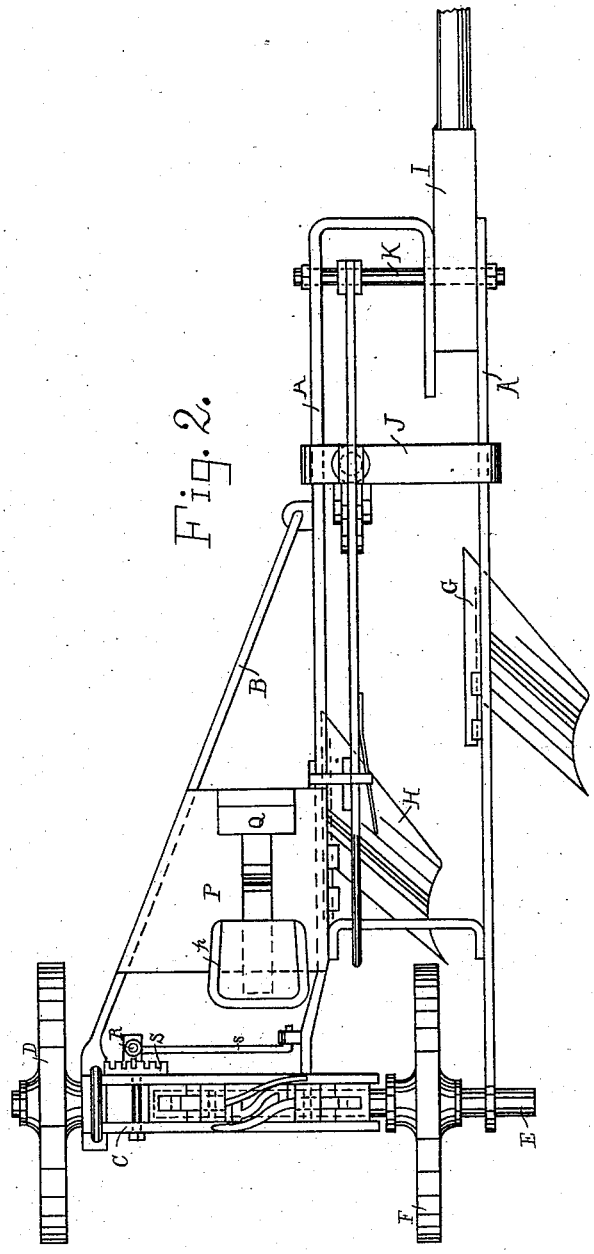
Figure 3:
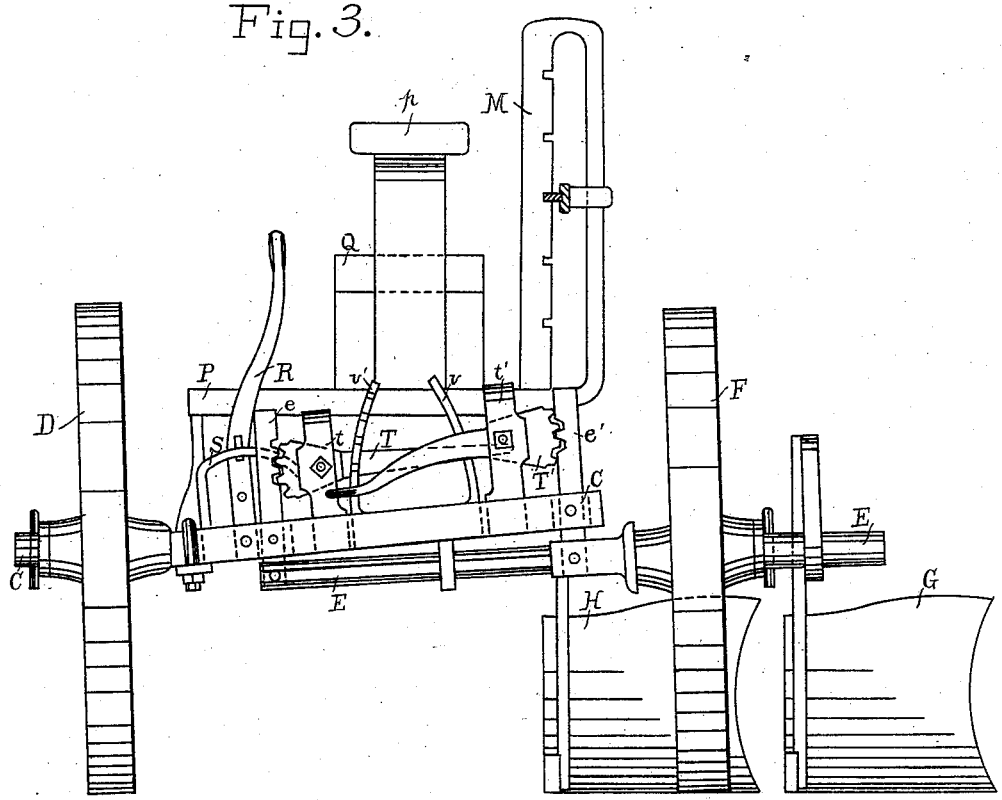
Figure 4:
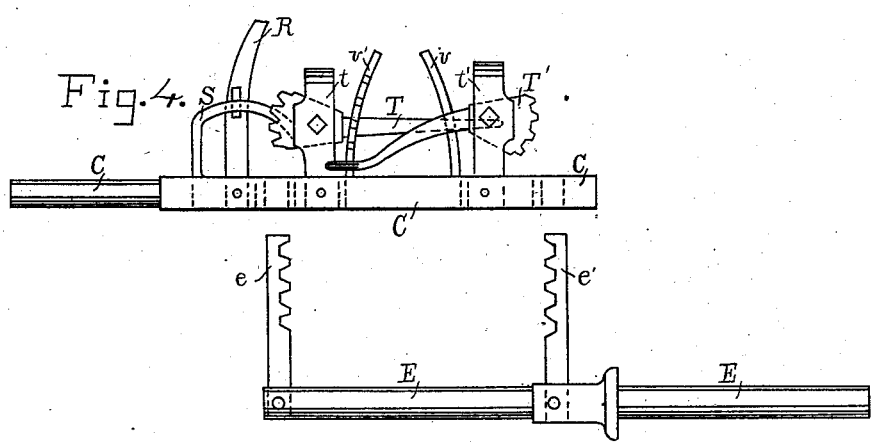

Figure 1 is a side elevation of my gang-plow. Fig. 2 is a plan of same. Fig. 3 is a rear view of same. Fig. 4 is a rear detail view showing axles C and E separated.

The object of my invention is to provide a gang-plow adapted to have the necessary adjustments by means of simple and effective mechanism.

A represents the frame of the device, consisting of two parallel strips; and B, a diagonal side brace pivoted to the main frame in front and forming a support or bearing for the axle of one of the wheels behind, Fig. 2.

C represents an axle supported by the brace B, and upon which is journaled a wheel, D. This axle is slotted from its journal to the inner end, Fig. 2.

E represents a second axle, preferably round in cross-section. It is under axle C and extends through the rear ends of frame A, and has journaled upon it between the strips of said frame a wheel, F. By this construction the wheel F may be placed lower than wheel D, which enables it to run in the furrow made by the plows, which are both upon this side, and yet keep the frame as straight as necessary.

Attached to the outer strip of frame A about its middle is a plow, G. This is secured by an ordinary standard, *g*.

H is a second plow, secured in a similar manner to the inner strip of frame A, and at a point behind the forward plow, G.

I represents the draft-bar.

J is a cross-bar upon frame A, and K is a cross-rod farther forward. Upon this is a standard, *k*, in the top of which is pivoted a long lever, L, passing back and engaging with a vertical rack, M, upon the frame A. This lever is pivoted in a bearing, *n*, swiveled on the top of a vertically-moving spindle, N, passing down through cross-bar J in a suitable socket, and having in its lower end a guiding or steering wheel, O. This spindle is the fulcrum of the lever, and the whole frame, turning upon the wheels D and F, is the weight. By lowering lever L the frame is raised, and by raising the lever it is lowered, thus raising the plows clear of the ground or lowering them into the ground.

Between the brace B and the inner strip of frame A is supported a platform, P, carrying a seat, *p*, from which the lever L may be operated.

Q is a tool-box upon platform P, which also serves for the foot-rest of the driver.

The axle E passes loosely through the rear ends of frame A, which may therefore be moved upon it as follows: Pivoted to the outer end of axle C is a lever, R, extending within reach of the driver. It engages with a curved rack-bar, S. It has attached to it a rod, *s*, the other end of which is secured to the inner strip of frame A. By moving this lever the frame A may be moved to one side to throw the plows to the land. This is of advantage when, upon sidling ground, it becomes necessary to move the plows a little to one side, so that the inner one may not slip down into the furrow made by the outer one. The position of the driver's seat behind the plows enables him to see the course of the plows, and to know just when to move them to one side, to change their inclination, or to raise or lower them entirely. The axle E has pivoted upon its end a vertical rack-bar, *e*, which projects through a suitable bearing in the slot in the axle C. With this rack-bar the toothed or ratchet head of a lever, T, engages. This lever is pivoted in a standard, *t*, upon the axle C, and engages with a rack, U, also on said axle. The axle E has pivoted near its wheel another vertical rack-bar, *e'*, extending through a guide in axle C. With this the toothed head of a lever, T', engages, said lever being pivoted in a standard, $t'$, upon axles C, and engaging with a rack, U', on said axle. Both levers T T' are within convenient reach of the driver, and their operation singly or together, by changing the relative position of the two axles with regard to the angle of their inclination toward each other, has the effect of changing the relative heights of the wheels and the inclination of the frame A, and consequently of the plows, even to the extent, when desired, of adapting them for a side hill.

Having thus described my invention, what I claim as new, and desire to secure by Letters Patent, is—

1. In a gang-plow, a frame the rear end of which is supported by and is adapted to slide upon an axle, E, suitable plows on the frame, and a link-connection to a lever, R, and a rack, S, on an axle, C, for throwing the frame laterally, substantially as herein described.

2. In a gang-plow, the frame A, having the plows G H, and the wheeled axle E, upon which the rear end of the frame A is supported and adapted to be moved laterally, in combination with the brace B, pivoted in front to said frame, the wheeled axle C, supporting the rear of said brace, the lever R, pivoted to said axle, rack S, and the rod $s$, connecting said lever with the frame A, substantially as and for the purpose herein described.

3. In a gang-plow, the frame A, having plows G H, and the axle E, having wheel F, in combination with the brace B, and the axle C, having wheel D, said axle C extending over the axle E, whereby its wheel is raised to adapt it to run on the land while the wheel F runs in the furrow, substantially as described.

4. In a gang-plow, the frame A, having plows G H, and the axle E, having wheel F, in combination with the brace B, axle C, having wheel D, said axle C extending in a plane parallel to axle E, and a mechanism to change or move the axles into planes at an angle with each other, substantially as herein described.

5. In a gang-plow, the frame A, having plows G H, and the axle E, having wheel F, in combination with the brace B, slotted axle C, having wheel D, said axle C extending over axle E, and the means for varying the angle of the axles with respect to each other, consisting of the pivoted vertical rack-bars $e\ e'$, secured to axle E and extending upward through the slotted axle C, the levers T T', fulcrumed in standards $t\ t'$ on axle C, and having toothed or ratchet heads engaging with rack-bars $e\ e'$, and the racks U U', with which said levers engage, substantially as herein described.

In witness whereof I have hereunto set my hand.

ROBERT HENDRICKS.

Witnesses:
H. B. THOMPSON,
JAS. W. BICKNELL.